United States Patent [19]
Wheeler

[11] Patent Number: 5,058,837
[45] Date of Patent: Oct. 22, 1991

[54] LOW DRAG VORTEX GENERATORS

[76] Inventor: Gary O. Wheeler, 2715 185th Ave. E., Sumner, Wash. 98390

[21] Appl. No.: 335,204

[22] Filed: Apr. 7, 1989

[51] Int. Cl.$^5$ .............................................. B64C 23/06
[52] U.S. Cl. .................................... 244/199; 244/198
[58] Field of Search ............... 244/199, 200, 130, 198; 280/762; 296/180.1, 180.2, 180.4

[56] References Cited

U.S. PATENT DOCUMENTS

| | | | |
|---|---|---|---|
| 1,994,045 | 3/1935 | Nelson | 244/200 |
| 2,163,655 | 6/1939 | Zimmerman | 244/199 |
| 2,532,753 | 12/1950 | Beman | 244/198 |
| 2,800,291 | 7/1957 | Stephens | 244/130 |
| 3,072,368 | 1/1963 | Seddon et al. | 244/200 |
| 3,525,486 | 8/1970 | Wimpenny | 244/199 |
| 3,578,264 | 5/1971 | Kuethe | 244/199 |
| 4,320,919 | 3/1982 | Butler | 296/180.1 |
| 4,655,419 | 4/1987 | van der Hoeven | 244/199 |

FOREIGN PATENT DOCUMENTS 2210011  6/1989  United Kingdom ................ 244/200

Primary Examiner—Joseph F. Peters, Jr.
Assistant Examiner—Anne E. Bidwell
Attorney, Agent, or Firm—George W. Finch

[57] ABSTRACT

A generally V-shaped device (40) that is installed on a surface (48) over which there is a flowing medium (50) whose viscosity causes a boundary layer to form between free-stream medium and the surface. The point (46) of the V-shape generator (40) is oriented facing the down stream direction. Usually a plurality of generators (40) are positioned in a line crosswise to the flow spaced so that the vortices created thereby do not interfere. Flow between the arms (42 and 44) of each generator (40) generates a pair of counterrotating vortices (64 and 68) with diameters (66) much larger than the height of the generator to provide stronger flow control with less parasitic drag than prior art vortex generators. The height of the generator (40) is usually less than the height of the local boundary layer (73), but may extend above the boundary layer (73) especially when the generator (40) is use to control spanwise flow or to reduce tip vortices.

33 Claims, 7 Drawing Sheets

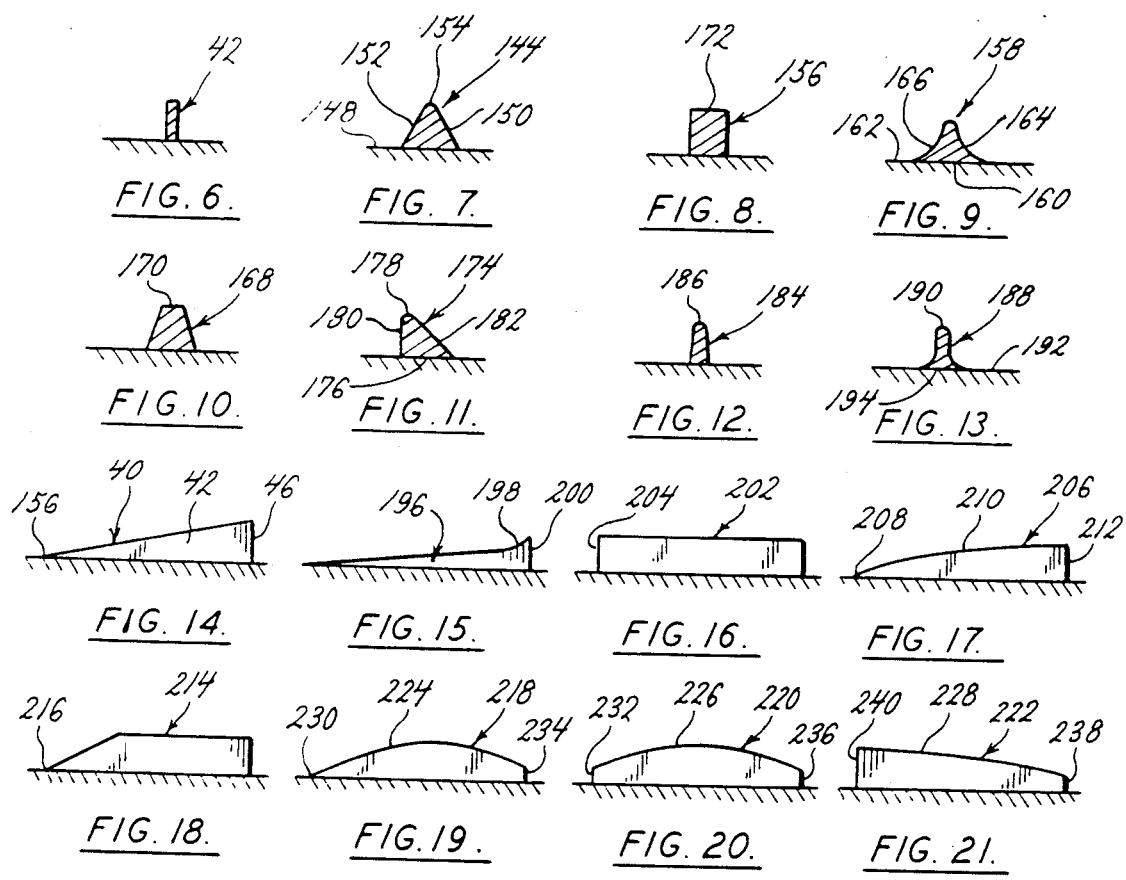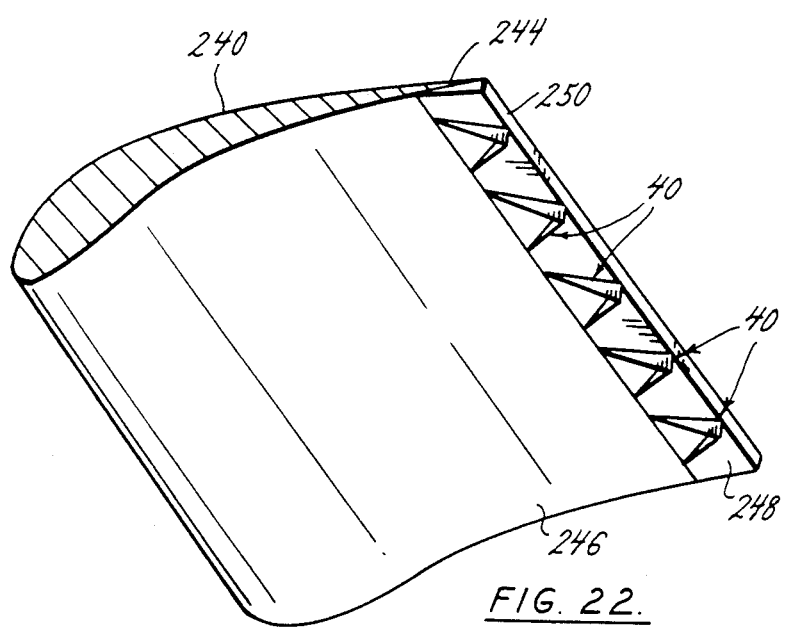

LOW DRAG VORTEX GENERATORS

TECHNICAL FIELD

My invention relates to vortex generators for application to flow control surfaces such as airfoils and hydrofoils which can create powerful vortices to transfer energy into a low energy boundary layer to delay flow separation without extending into the freestream flow to cause excessive parasitic drag. The generators generate such large vortices that they also can be used as flow straighteners and fences to prevent span wise flow and to reduce tip vortices.

BACKGROUND OF THE INVENTION

Vortex generator devices are used to delay or eliminate flow separation along a flow control surface. Conventional vane type vortex generators are used widely on aircraft for lift enhancement and drag reduction. Vane type vortex generators are sharp blades extending normal to the surface and with an angle of attack to the flow at least during the time vortices are to be generated. Flow migrating over the outer tip of each vane can create a useful streamwise vortex that mixes high speed fluid from the free stream into the sluggish energy-deficient boundary layer. This mixing increases the energy in the boundary layer, making it resistant to flow separation. The process is called passive boundary layer control. Vane vortex generators are disadvantageous when they are needed for only a small part of the operating time because they are high drag devices. Therefore, in some applications, the complexities of making them retractable has been considered, such as is shown in Bauer, U.S. Pat. No. 4,039,161.

Low-drag vortex generators such as the ramp vortex generators shown in STEPHENS, U.S. Pat. No. 2,800,291, the crest vortex generators shown in KUETHE, U.S. Pat. Nos. 3,578,264 and 3,741,285, and the cascade vortex generators shown in WHEELER, U.S. Pat. No. 4,455,045 employ rather passive geometries that do not themselves operate at an appreciable lift coefficient, so they minimize induced drag.

To minimize parasitic drag requires that any vortex generator be sized so it is submerged entirely within the boundary layer. This results in weak vortex formation because the vortices are formed from sluggish boundary layer flow. Consequently, when sized to fit within the boundary layer, neither vane vortex generators, nor STEPHENS' ramps have proved to be powerful enough to be useful in practical applications.

KUETHE's crest vortex generators and WHEELER's cascade vortex generators address this problem of vortex formation from sluggish boundary layer flow by employing fore and aft arrays of vortex generators so that upstream vortices are reinforced and augmented by uniting them with downstream formed vortices of the same sign of rotation. Unfortunately, this approach is fraught with difficulty. For example, with KUETHE's crests, any off-axis flow from yaw or side currents carry the upstream vortices away at an angle so they are likely to arrive at the wrong downstream stations and create damaging vortex interference. WHEELER's cascades avoid this problem because the devices physically overlap themselves, but their complex geometry is laborious to fabricate and costly to tool or machine. Moreover, there are many applications with insufficient room to accommodate the chordwise length of the cascades.

Therefore there is need for an easily fabricated, passive device which can be sized to nestle within the boundary layer and which can pump large amounts of energy into the boundary layer of a flowing medium to prevent flow separation with its inevitable drag increase and lift reduction. There also is need for an easily installed device which can be sized to restrict spanwise flow even at a flow surface tip where undesirable tip vortices normally form when the flow surface is generating lift.

SUMMARY OF THE PRESENT INVENTION

The present invention is a "male" V or Y form resembling a wishbone that is positioned on a flow control surface with its apex pointing downstream. Visually, the present vortex generator resembles a STEPHENS ramp with most of the interior removed leaving only the original sidewalls and apex. In its thinnest-walled form, the generator resembles two short vane vortex generators positioned so their trailing edges touch. The height of the sidewalls of the present generator may be any size, but in applications where the minimizing of parasitic drag is important, the maximum sidewall height should be less than the local boundary layer depth at all operating conditions of interest.

When the present generator is installed on a surface over which a medium such as air or water is flowing, the medium flows between the sidewalls until it stagnates at the apex thereof. This stagnation creates a local high static pressure bubble that forces oncoming medium to be ejected vertically over the sidewalls. This strong vertical mass flow, driven by full stagnation pressure, forms an extraordinary large sized pair of counterrotating vortices when the lofted medium crosses at an angle over the clean, undisturbed flow along the external faces of the sidewalls. Each vortex generated by the present invention has a diameter of up to, and in some instances above, five times the maximum height of the sidewalls above the surface on which the generator is installed. It has been found critically important that excellent quality attached flow exist along the external sidewalls. Good quality flow along the outer sidewalls of the present invention requires that each generator be spaced apart a sufficient distance to prevent interference between adjacent vortices.

For low drag applications, the vortices should extend upwardly toward, but not substantially above the boundary layer so that the energy of the free-stream is added to the low energy boundary layer medium without disturbance of the free stream. The potential drag of separated flow is much greater than the parasitic drag caused by the vortices so there can be a net drag reduction even when the generators are used to increase lift.

In preliminary wind tunnel tests, a spanwise array of the present vortex generators submerged to 60% of the local boundary layer depth and positioned at the 0.22 chord location, reduced the drag of an LA2573A Liebeck low Reynolds Number laminar flow airfoil by an average 29% between 2° and 8° angle of attack at the target Reynolds Number of 235,000. Hot wire anemometry showed the airfoil's boundary layer was made ½ thinner as far downstream as the 0.70 chord location. Although the generators were downsized for an emphasis on drag reduction, the airfoil's stall angle increased one degree which represents about 5% additional maximum lift. Prior art devices have never performed so efficiently to alleviate laminar separation bubbles. Later tests showed 20% rather than 60% height generators caused an average drag reduction of 35% for angles of attack from 2° to 8° on the same airfoil, indicating a vortex effective diameter at least 5 times greater than the height of the generator.

During the same test series, the present invention was turned around and installed backward so the apexes thereof pointed upstream exactly as per KUETHE's individual chevron-like crests or those shown in HOADLEY, U.S. Pat. No. 2,650,752. Drag was reduced only by an average 20% and the airfoil stalled 3° prematurely, which represents about a 15% degradation of maximum lift. Obviously, the flow mechanisms are different. Although KUETHE's forward-pointing crests appear more streamlined to the eye, they suffer from a flow separation bubble that forms immediately behind each forward-facing apex that damages the flow along the sidewall which is so important to the required cross-flow. Similarly, the present invention operates differently than the portions of KUETHE's zigzag arrays that constitute V-forms with apexes pointing downstream. Once again, a region of flow separation behind the alternating forward-facing apexes of the zigzag array destroys the flow mechanism necessary to generate the desired large vortices.

The present vortex generators having planform shapes with straight sidewalls function well, but wishbone-like planforms with an Ogee shape enable use of the widest possible mean included angle between the sidewalls without provoking local flow separation at the leading edges of the sidewalls. Planform included angles from 15° to approximately 80° are functional. In principle, wide planforms are more desirable than narrow ones because they create vortices with higher rotational speed. This is particularly true in low speed flow, but in transonic or supersonic flow, care must be taken to select a planform narrow enough to fall within the local Mach shock cone angle. In some applications, such as flow straightening or tip vortex reduction, it is possible to extend the apex of the "V" shape until an approximate Y planform is produced. The "Y" shaped generators can have disadvantages however, as the extending single wall can produce drag with the generated vortices to reduce their rotational energy.

The present vortex generators can be made of single-thickness material simply bent to shape or they can be made with sidewalls of intermediate thickness. Preferred embodiments have relatively thin sidewalls but the invention can accommodate walls of greater thicknesses, if required for structural considerations. The edges of the sidewalls should have relatively small radii but need not be knife sharp.

It is therefore an object of the present invention to provide a device for reducing the boundary layer depth of a medium moving over a surface.

Another object is to provide means for increasing maximum lift without creating excess drag at lower lift angles of attack.

Another object is to provide an efficient vortex generator which can be easily constructed and can be applied in a wide range of applications.

Another object is to provide a vortex generator which can be integrated into an aesthetic design such as of a motor vehicle.

Another object is provide a vortex generator that can fit in a small space.

Another object is to provide vortex generators which can be used singly, or as cooperative arrays.

Another object is to provide vortex generator means which can be sized and shaped for different mediums and widely different Reynolds Numbers.

Another object is to provide a vortex generator that can be constructed of a thin membrane of pliable material that will open to the proper shape when exposed to a flowing medium.

These and other objects and advantages of the present invention will become apparent to those skilled in the art after considering the following detailed specification which covers preferred embodiments thereof in conjunction with the accompanying drawings wherein:

BRIEF DESCRIPTION OF THE DRAWINGS

FIG. 6 is a cross-sectional view of a sidewall of a vortex generator of FIG. 5 taken on line 6—6 therethrough;

FIGS. 7 through 13 are cross-sectional views similar to FIG. 6 showing some different sidewall cross-sectional configurations of vortex generators constructed according to the present invention;

FIG. 14 is a cross-sectional view taken on line 14—14 of FIG. 5;

FIGS. 15 through 21 are cross-sectional views, similar to FIG. 14, showing modified sidewall shaping;

FIG. 22 is an underside perspective view of an airfoil having a trailing edge wedge with vortex generators constructed according to the present invention installed thereon;

DETAILED DESCRIPTION OF PREFERRED EMBODIMENTS

Figure 1:
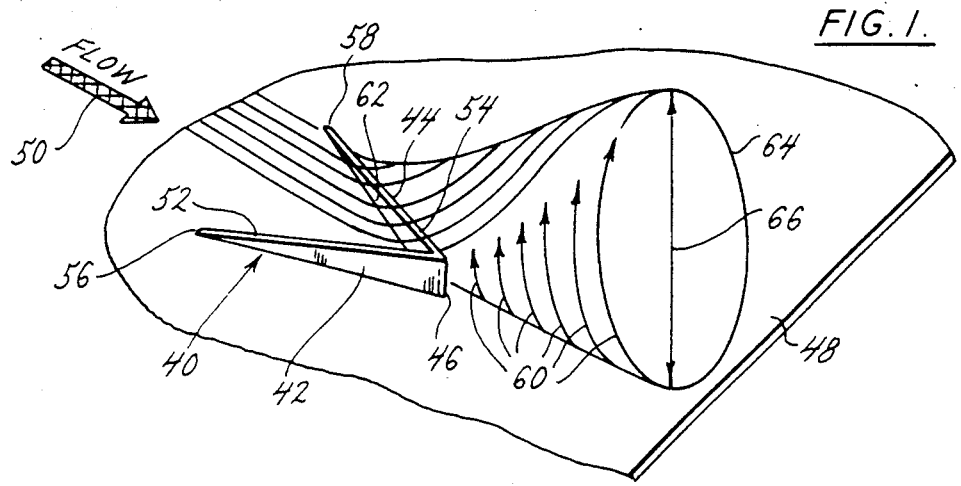
FIG. 1 is a perspective view of the present invention with the medium flowing over one side thereof being visualized.

Referring to the drawings more particularly by reference numbers, number 40 in FIG. 1 refers to a vortex generator constructed according to the present invention. The vortex generator 40 includes a pair of sidewalls 42 and 44 which join together at an apex to form a generally V-shape. The sidewalls 42 and extend upwardly from a flow control surface 48 into a flowing medium whose existence and flow direction is indicated by the arrow 50. In most instances the flowing medium 50 will be air or water. However, hot combustion products, such as are inside a gas turbine, other gasses and other fluids can be accommodated by the generator 40. The sidewalls 42 and 44 have upper edges 52 and 54 which slant upwardly from the upstream tips 56 and 58 to the apex 46 away from the surface 48. The flowing medium 50, whose flow paths over sidewall 44 are shown in detail by arrows 60 only over one sidewall 44 for clarity, first contacts the inner surface 62 of the sidewall 44. Some of the flowing medium 50 is lifted near the tip 58 to start a vortex swirl while other portions thereof is herded toward the apex 46 by the sidewall 44. A large pressure bubble forms adjacent the apex 46 and violently ejects the flowing medium 50 upwardly to produce a vortex 64 having a diameter 66 which has been measured in some instances more than five times the maximum height of the vortex generator 40 above the surface 48.

Figure 2:
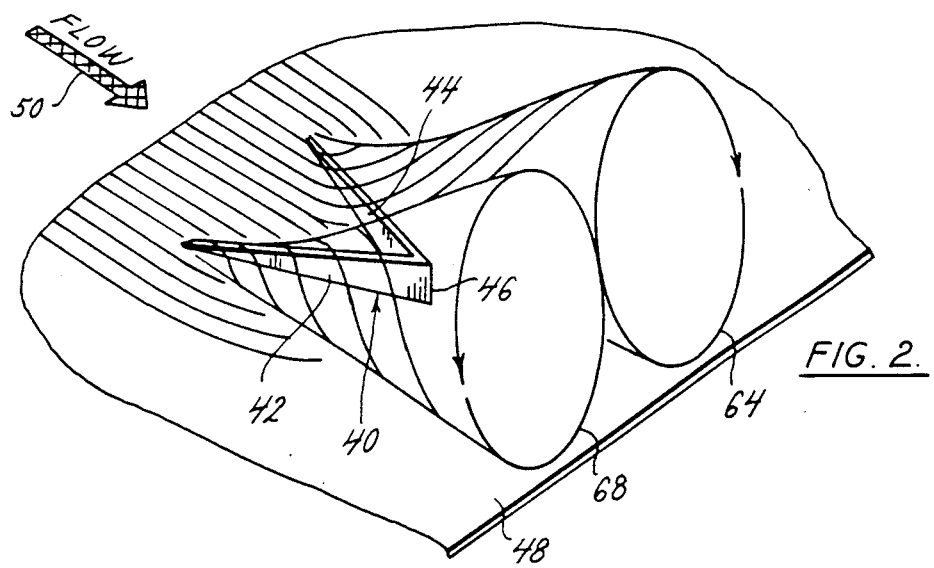
FIG. 2 is a perspective view of the vortex generator of FIG. 1 with the entire flow of medium thereover being visualized.
Figure 3:
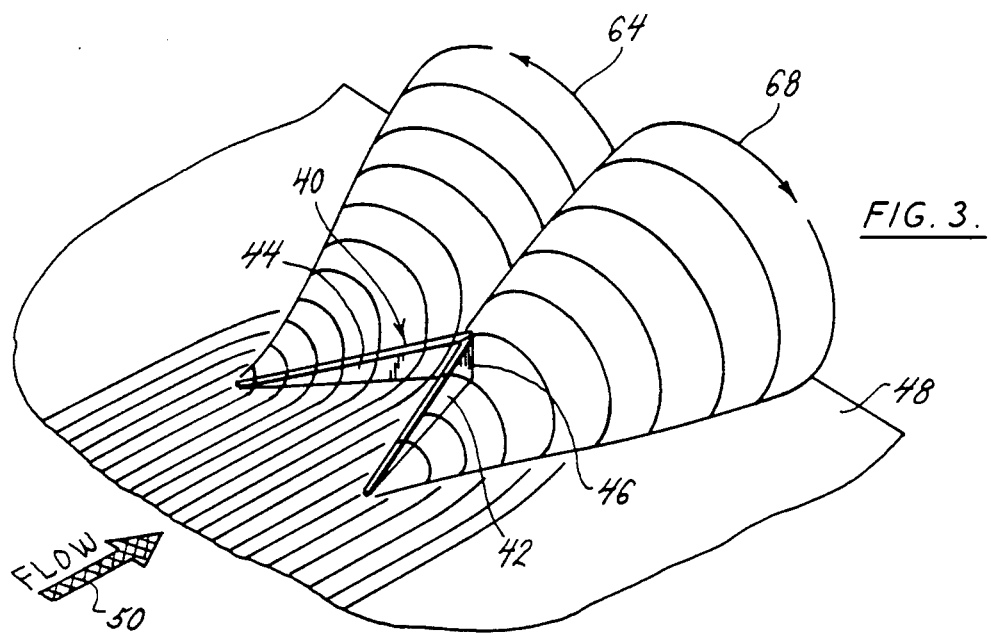
FIG. 3 is a perspective view of the vortex generator of FIGS. 1 and 2 showing the flow thereabout from generally the upstream direction.

In FIGS. 2 and 3 vortex 68 created by sidewall 42 is also shown. It should be noted that the vortices 64 and 68 counterrotate with their adjacent side rotating upwardly from the surface 48 on which the generator 40 is positioned. In this way they reinforce each other to produce vortices of generally equal energy.

Figure 4:
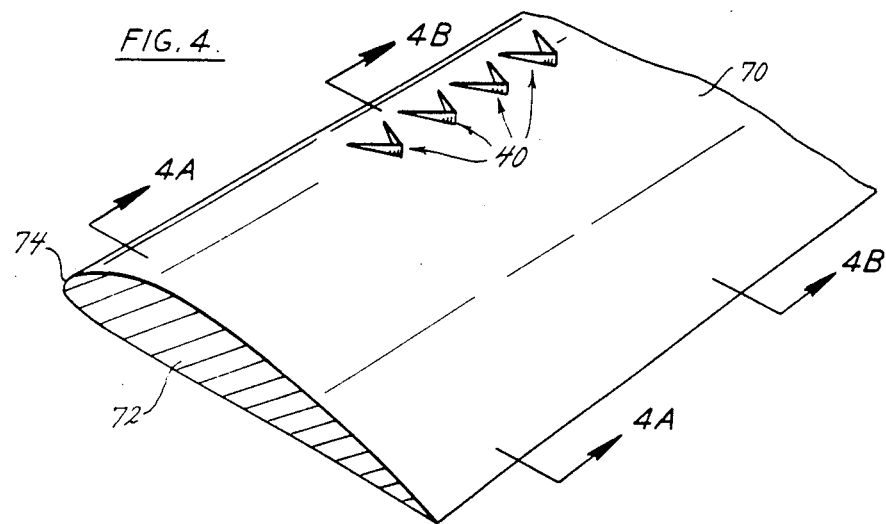
FIG. 4 is a perspective view of an airfoil having vortex generators of the present invention arrayed thereon.
Figure 4A:
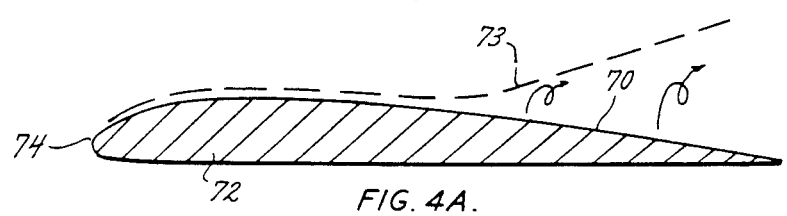
FIG. 4A is a cross-sectional view taken at line 4A—4A of FIG. 4.
Figure 4B:
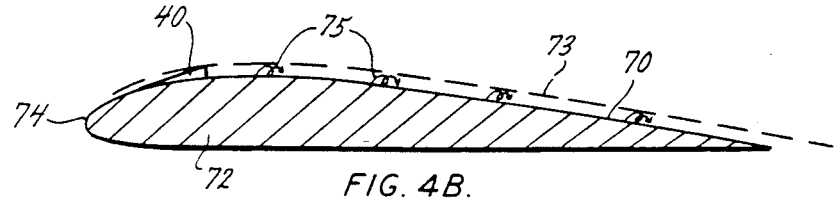
FIG. 4B is a cross-sectional view taken at line 4B—4B of FIG. 4.

An application for the vortex generators 40 is shown in FIG. 4 where they applied to a portion of the upper surface 70 of an airfoil 72. The effect of the vortex generators 40 on the boundary layer 73 is shown in FIGS. 4A and 4B. The array of vortex generators 40 are positioned downstream from the leading edge 74 of the airfoil 72 where they can generate vortices 75 for pumping energy into the boundary layer 73 to prevent the flow separation shown in FIG. 4A and to increase the lift of the airfoil 72. To do this with minimal parasitic drag, the vortex generators 40 are sized to remain in the local boundary layer 73 as shown in FIG. 4B. The depth of the local boundary layer depends upon the shape of the airfoil 72 and the Reynolds number of the air passing thereover.

Figure 5:
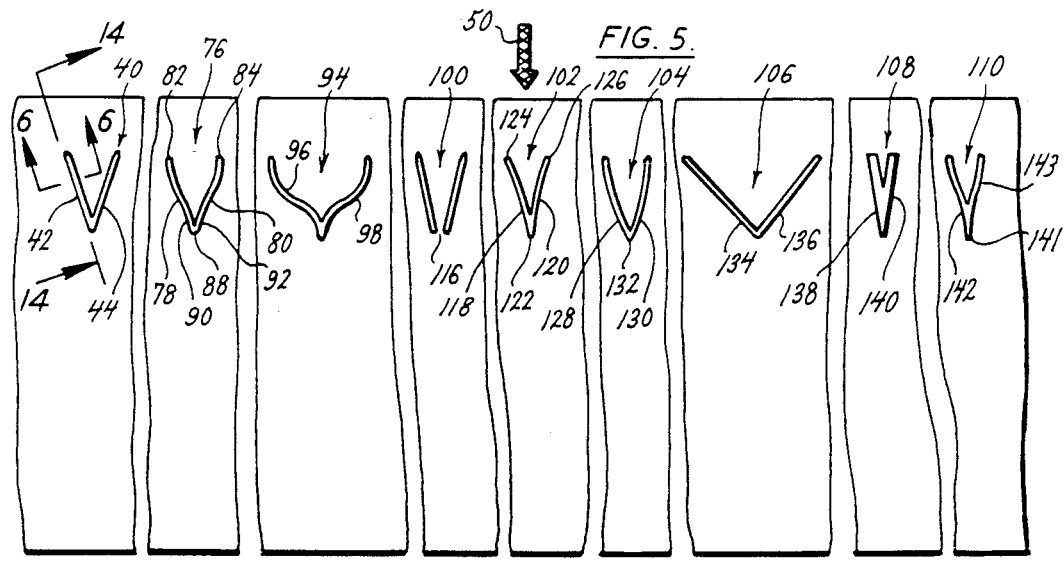
FIG. 5 is a top plan view of a flow control surface having different configurations of vortex generators constructed according the the present invention thereon.

The vortex generator 40 is shown in top plan view in FIG. 5 as having a generally a V-shape with straight sidewalls 42 and 44. Other sidewall top planforms are also possible and preferable in certain applications. For example, vortex generator 76 has an Ogee shape with sidewalls 78 and 80 having upstream tips 82 and 84 almost parallel to the flowing medium 50. The sidewalls 78 and 80 also include center portions 86 and 88 which curve inwardly toward each other to produce a substantial angle with respect to the flowing medium 50 before being joined at the apex 88 by apex portions 90 and 92 where the sidewalls 78 and 80 again almost become parallel to the flowing medium 50. The angle that the center portions 86 and 88 make with the flowing medium 50 can be extremely high as shown in similar generator 94 where the center portions 96 and 98 thereof make 60° angles with the flowing medium 50.

Vortex generators 100, 102, 104, 106, 108 and 110 have sidewalls of slightly different planform shape to accommodate different circumstances. For example, vortex generator 100 has straight sidewalls 112 and 114 which are slightly gapped at the apex 116. Generally, the gapped apex 116 is undesirable. However, some materials and some structural consideration may require such a configuration and so long as the gap at the apex 116 is such that the viscosity of the flowing medium 50 prevents substantial flow therethrough the gapped apex 116 can be tolerated. In generator 102 the sidewalls 118 and 120 are curved to gradually reduce their angle with respect to the flowing medium 50 toward the apex 122. This configuration is used when it is desirable and possible to start the vortices generated thereby rather abruptly. At high Reynolds numbers this configuration suffers from separation adjacent the upstream tips 124 and 126 thereof. In generator 104 the sidewalls 128 and 130 curve oppositely to those sidewalls 118 and 120 of generator 102. This results in a gentle building of the vortices gradually increasing in ferocity until a major portion of the flowing medium 50 is jammed upward at the apex 132 thereof. In generator 106, straight sidewalls 134 and 136 are placed at about an 80° angle to each other which preliminary testing shows is about the maximum for relatively small Reynolds numbers and straight sidewalls. High Reynolds numbers approaching transonic flow require a lesser angle and generator 108 has straight sidewalls at a 15° angle which is about as small an angle as can capture enough flow to be effective. It should be noted that the sidewalls 138 and 140 of the generator 108 are relatively thick to accommodate the stresses attendant with transonic flow.

Generator 110 is similar to generator 80 except its apex 141 extends downstream until its planform is Y-shaped. All of the vortex generators described herein can have an extended apex, like apex 141. However, such normally is used when the vortex generators are employed at least in part as flow straighteners, such as to reduce wing tip vortices or excessive spanwise flow. The extended apex 141 does remove energy from the generated vortices but it assure that they do not get bent by spanwise flows. The vortices seem to act like fences to prevent such spanwise flows. If the generator 110 is to be used in a severe flow straightening situation, its sidewalls 142 and 143 might be as much as four times the local boundary layer depth since losses due to spanwise flow and wing tip vortices can otherwise greatly exceed any parasitic drag that would be created by such sidewall height.

FIG. 6 shows the cross-section of sidewall 42 as cut by line 6—6 in FIG. 5. The sidewall 42 has a tall thin cross-section, such as would occur if the generator 40 is constructed from sheet stock. The sidewall 42 is extremely weight efficient and is useful for relatively low Reynolds number airflows. However, it is not robust enough for all applications. FIGS. 7 through 13 show other typical sidewall cross-sections which are useful in particular applications. FIG. 7 shows a sidewall 144 having a triangular cross-section with its broadened base 146 attached to the surface 148 over which flow is occuring. Both the inner and outer surfaces 150 and 152 of the sidewall 144 are canted toward each other as they approach the upper edge 154. A vortex generator constructed with sidewalls like 150 is extremely robust for severe applications, has a relatively sharp upper edge for efficiency and, when joined, the junction of the inner walls 150 provides a canted apex which ejects the high pressure bubble upwardly to assist vortices creation. The sidewall 156 of FIG. 8 is a thick rectangular configuration useful in extreme environments where the expense of complex tooling cannot be economically justified. The sidewall 158 of FIG. 9 has the same general shape as sidewall 144 but with a broader base 160. The boarder base 160 is helpful in attachment to the surface 162 especially when relatively weak fastening systems such as glue must be employed. It should be noted that the inner and outer side surfaces 164 and 166 of the sidewall 158 have concave curves which on the inner surface 164 evenly flows the medium up over the sidewall 158 to start the vortex and on the outer side surface 166 generally matches the curvature of the forming vortex to reduce parasitic drag therewith. The sidewall 168 of FIG. 10 has a trapezoidal shape and is similar to sidewall 144 with its upper edge 154 removed so that a more blunt upper edge 170 is presented. Sidewall 168 is used in extremely severe situations where the disadvantage of a wide upper edge such as exists in the upper edge 172 of sidewall 156 is undesirable. In sidewall 174 of FIG. 11, an easily constructed shape with a robust base 176, a relatively sharp upper edge 178, a generally vertical side surface 180 and a canted side surface 182 is shown. If a more gentle launch of the vortex is required, then canted side surface 182 is used as an inner surface. However, if abrupt launch and a surface that more closely follows the shape of the shed vortex is desired then side 180 is formed as the inner surface. Sidewall 184 of FIG. 12 essentially is the same as sidewall 42 with a rounded upper edge 186. If the sidewall 184 is constructed such as by molding rounded or at least a nonknife sharp upper edge 186 is desirable. Sidewall 188 of FIG. 13 is similar to sidewall 158, having a longer narrower upper edge 190. Sidewall 188 is suitable for molding separately and then gluing or otherwise attaching to a surface 192 at its broad base 194.

FIG. 14 is a cross-sectional view of sidewall 42 of vortex generator 40 taken on line 14—14 in FIG. 5. Such a triangular shape is easy to form, has a sharp tip 195 to commence the flow on a straight V-type generator 40 and is generally desirable because of its simplicity. Other sidewall side-shape can also be advantages. For example, the sidewall 196 of FIG. 15 has an upper edge 198 which ramps upwardly toward its apex 200 to assure a strong upward lift of the pressure bubble but at the expense of additional complexity and reduced structural integrity. The sidewall 202 of FIG. 16 has a rectangular shape and is suitable for generators having a planform shape like vortex generator 76 since its blunt tip 204 should have very little angle of attack with the flow or flow separation will result. The sidewall 206 of FIG. 17 has a sharp tip 208 and a convex curved upper edge 210. This shaping is especially desirable with vortex generators, like generator 102, where the angle of attack with the flow decreases toward its apex 122, the apex of sidewall 206 being numbered 212. The sidewall 214 of FIG. 18 is a modification of the sidewall 202 of FIG. 16, a sharpened tip 216 being provided. Sidewalls, such as sidewall 214, normally are constructed by forming a sidewall with the shape of 202 and then machining off a portion thereof until the sharpened tip 216 appears. Therefore, it has the forming and structural advantages of sidewall 202 without the general requirement for use on a planform shape, such as those of vortex generators 76 and 94 of FIG. 5. Sidewalls 218, 220 and 222 of FIGS. 19, 20 and 21 respectively, have relatively complex curved upper edges 224, 226 and 228. The upper edges 4 and 226 are similar, except the sidewall 218 has a relatively sharp tip 230, whereas tip 232 of sidewall 220 is slightly blunted. As stated before, blunted tips are generally disadvantageous but sometimes are required because of structural or space limitations. The convex curved upper edges 224, 226 and 228 result in apexes 234, 236 and 238 of reduced height as might be required if the vortex generator 104 ejects medium upwardly with such a force otherwise that the vortices undesirably extend substantially beyond the local boundary layer to create drag. The blunt apexes 234, 236 and 238 might also be used to reduce the height and the drag of the extended apex 141 of vortex generator 110 of FIG. 5. Of course, the severely blunt tip 240 of sidewall 222, in most instances, demands planform shaping, such as that of generators 76, 94, 104 and 110.

As can be seen from the Figures, vortex generators of the present invention have sidewalls which are generally longer than tall. A ratio of length to height of at least 2 seems to produce suitable vortices in air without sidewall separation problems.

The application of the present vortex generators heretofore has been discussed in applications which are generally one-to-one substitutes with previous types of vortex generators. In FIGS. 22 through 34 less conventional applications of the present vortex generators made possible by their reduced height and powerful effect are shown. In FIG. 22 an airfoil 240 is shown having a device called a trailing-edge wedge 242 connected at its trailing-edge 244 on the bottom surface 246 thereof. Trailing-edge wedges are devices used to boost circulation over the upper surface of an airfoil to increase its lift at a lower angle of attack and increase its maximum lift. Trailing-edge wedges have been used since the early 1970s on race car wings and, in fact trace their history back to the structures taught by ZAPARKA in U.S. Pat. No. RE. 19,412. As shown in FIG. 22, vortex generators 40 constructed according to the present invention are applied in an array along the underside 248 of the trailing-edge wedge.

The vortex generators 40 increase the stagnation pressure upstream of their apexes 46 to boost circulation lift and shed streamwise vortices to reduce the base pressure drag of the trailing-edge wedge's blunt trailing edge 250. Field tests with hydrofoils have shown that the vortex generators 40 improve the efficiency for an entire foil and wedge combination about 20% at the target angle of attack.

Figure 23:
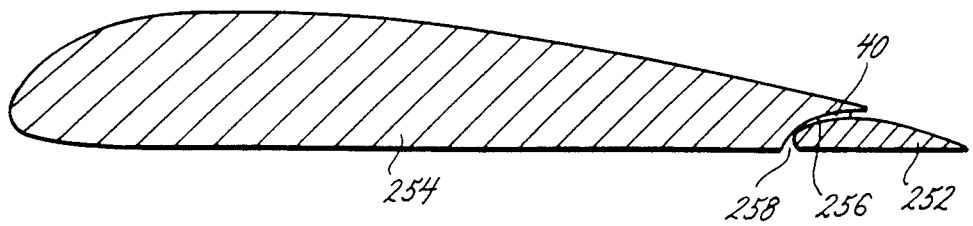
FIG. 23 is a cross-sectional view of an airfoil including a flap having vortex generators of the present invention placed thereon.
Figure 24:
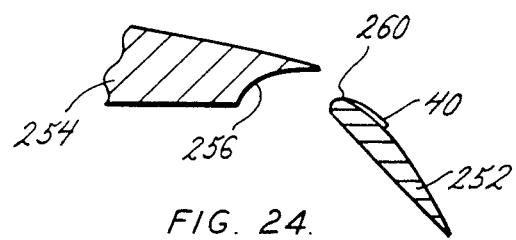
FIG. 24 is a partial cross-sectional view of the flapped airfoil of FIG. 23 with the flap in its extended position.

Another application of the present vortex generators is to increase the lifting power of a flap 252 used in association with an airfoil 254, as shown in FIG. 23 and 24, the flap 252 being shown deployed in FIG. 24 without including the deploying mechanism for clarity. When a flap is deployable, as shown in FIG. 24, it normally is known as a Fowler flap, and it slides rearwardly from the airfoil 254 and then is canted downwardly. As can be seen in FIG. 23 there is very little room between the flap pocket surface 256 and the flap 252. The very small gap 258 shown is desirable for aerodynamic cruise purposes since a larger gap produces undesirable drag. As shown, the vortex generators 40 are placed adjacent the leading edge 260 on the upper surface 262 of the flap where their shed vortices prevent boundary layer thickening and flow separation and thereby increase the maximum lift that can be achieved by the combination. Since the vortex generator 40 only need have a height which is a small fraction of the local boundary layer, like 20% or less, the height of the generators 40 can be well tolerated within the gap 258.

Figure 25:
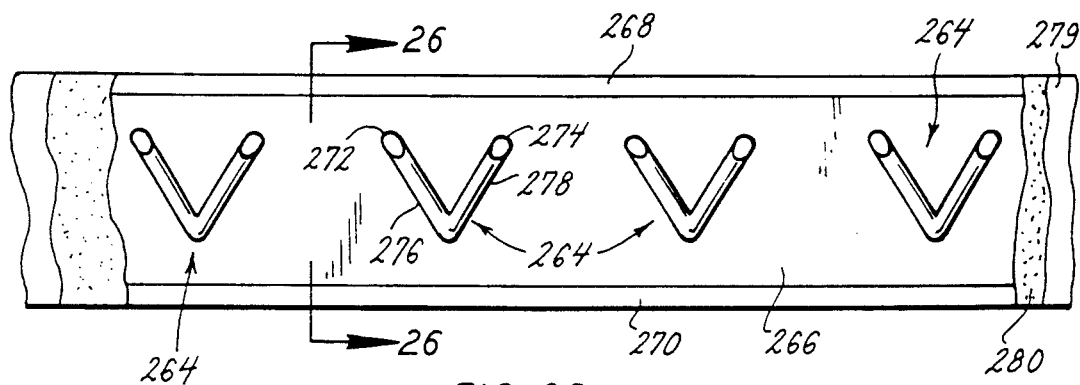
FIG. 25 is a top plan view of an array of vortex generators constructed according to the present invention on modified plastic lettering tape.
Figure 26:
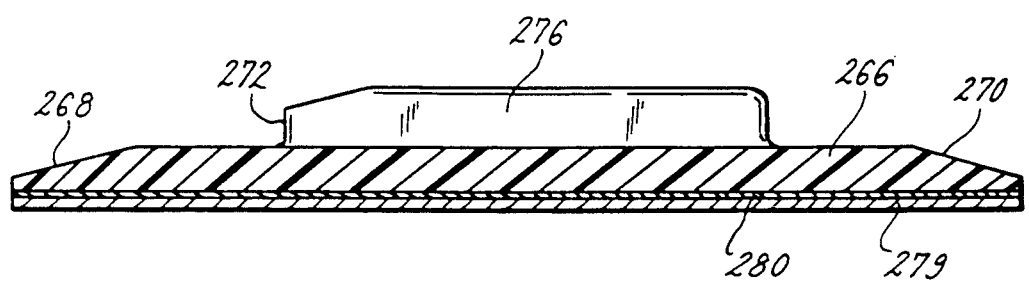
FIG. 26 is a greatly enlarged cross-sectional view taken on line 26—26 in FIG. 25.

The vortex generators 264 of FIG. 25 illustrate just how small the present invention can be constructed as still be effective. The generators 264 are formed on a Dymo brand lettering strip, such as used to construct stick on labels. The plastic strip 266 has been embossed with the letter V every other space therealong to form the vortex generators 264. Since the generators 264 are very short in height, they also may be located in every space. As shown in FIG. 26, the leading edge 268 and the trailing-edge 270 of the strip 266 has been sanded off. In fact, the maximum thickness of the strip 266 other than in the area of embossment is less than a 1/64" which is well within most boundary layer depths. In sanding the leading edge 268 the leading tips 272 and 274 of the sidewalls 276 and 278 are also sanded to provide a shape somewhat like sidewall 214 of FIG. 18. Such a very cheaply formed array of vortex generators 264 can be attached by removing the protective backing 279 of the strip 266 and pressing its adhesive backing 280 onto a surface for very economic testing purposes and moved back-and-forth on the surface to which it is applied to very quickly optimize the array.

Figure 27:
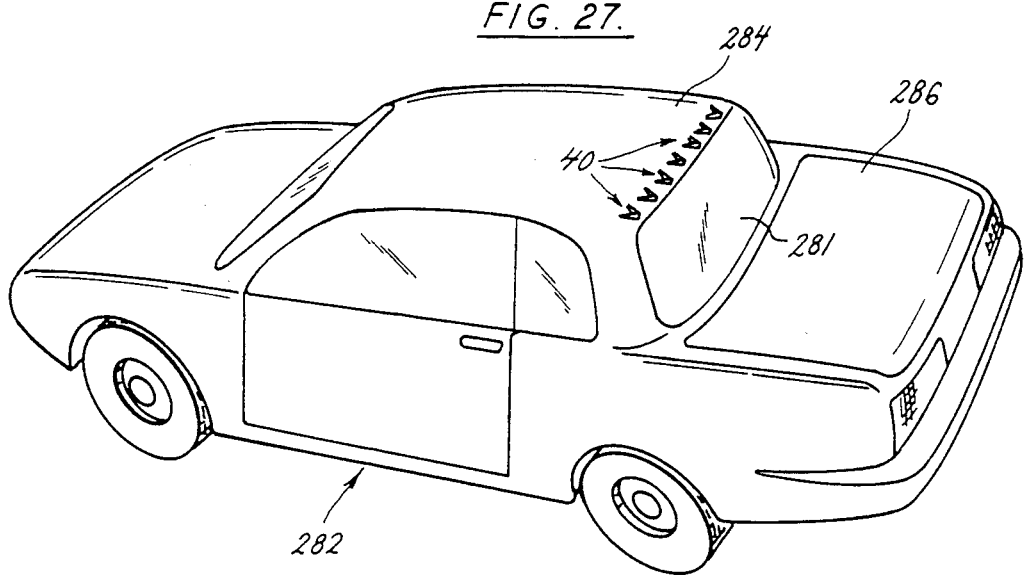
FIG. 27 is a perspective view of a sedan-type vehicle having an array of the present vortex generators constructed according to the present invention installed to reduce air drag over the stepped rear window thereof.
Figure 28:
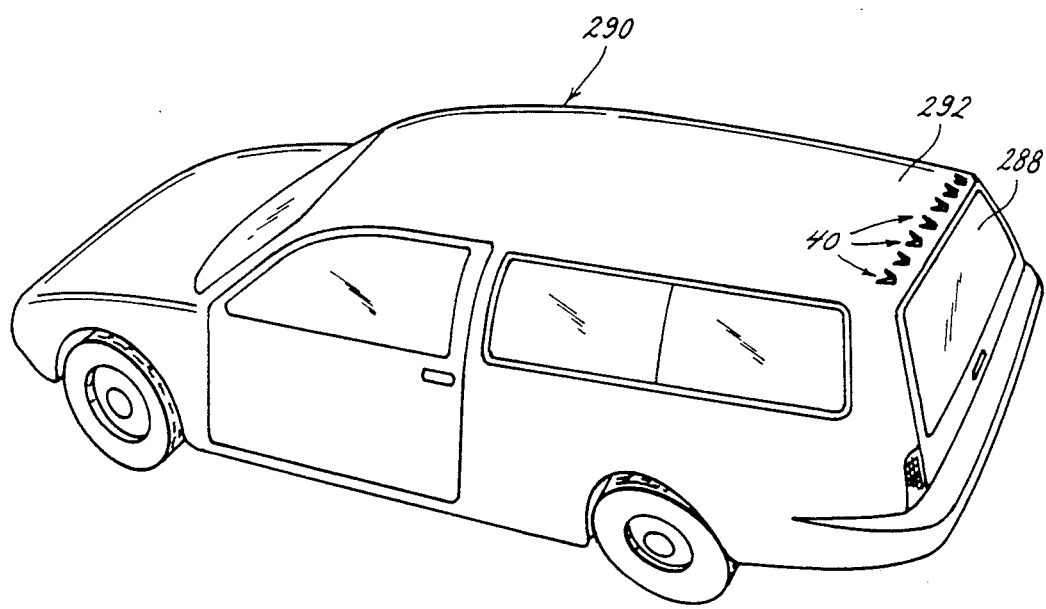
FIG. 28 is a perspective view of a station wagon-type vehicle having an array of the present vortex generators installed to reduce the base pressure drag of the bluff body created thereby.

As shown in FIGS. 27 and 28 the vortex generators herein disclosed can be used to modify the base flow mechanisms behind bluff bodies. When placed ahead of a step such as ahead of the rear window 281 on the sedan 282 of FIG. 7 on the roof top 284 thereof, the steamwise vortices created thereby greatly alter the departure angle of flow over the rear window 281. Sedans, like the sedan 282, experience net drag reductions as great as 4% when with vorticity the rooftop flow is re-aimed downward toward the trunk 286 thereof at approximately 30°. Previous devices capable of performing this function had to be ¼" tall and 3 ½" long whereas the present invention for this application need only be a ¼" tall and ⅞" long thereby being easier to blend in to the aesthetic overall design of the sedan 282. In some instances, 0.88 inch long by 0.31 inch high devices have shown excellent function.

By simply releasing streamwise vortices into the perimeter of the wake of a bluff body such as over the rear window 288 as shown with the station wagon 290 of FIG. 28, wherein vortex generators constructed according to the present invention are positioned adjacent the rear window 288 on the top 292 of the wagon 290, the suction imposed on the base can be reduced approximately 15%. Since base pressure drag is usually about ⅓ of the total aerodynamic drag of a van or a station wagon, there is a potential for a 4% net drag reduction. Prior art vortex generators besides being large and unsightly have had to extend into the airstream so much that the parasitic drag they cause almost exactly equals the base pressure drag reduction so that no actual net drag reduction is accomplished.

Figure 29:
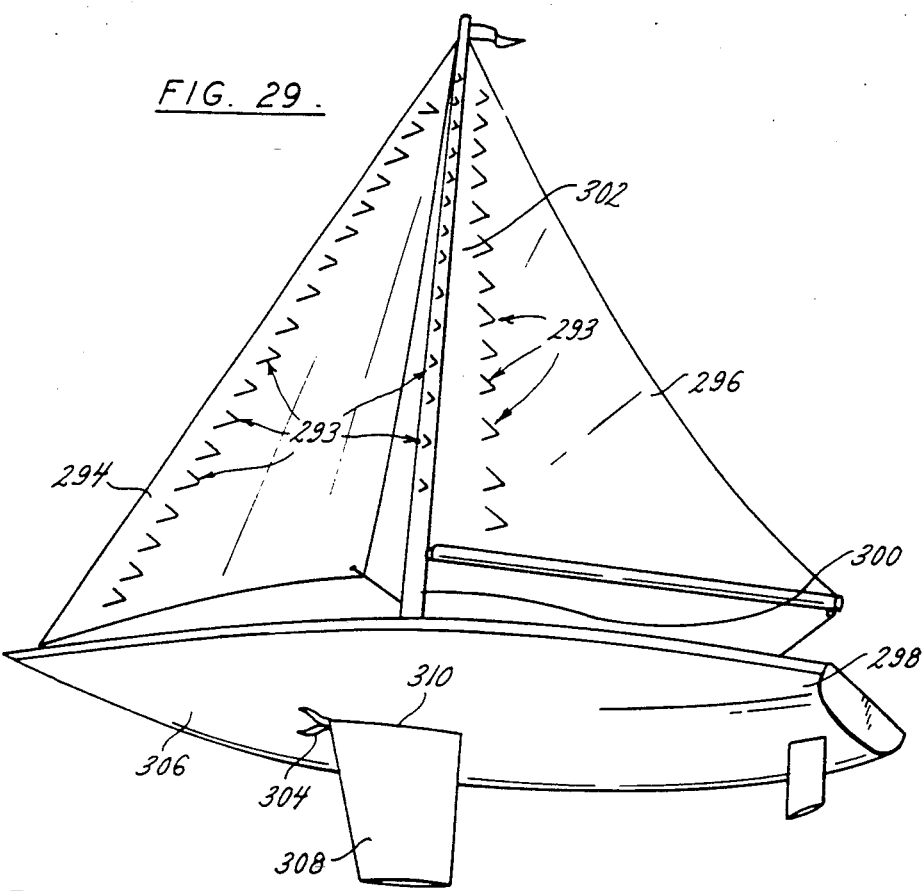
FIG. 29 is an underside perspective view of a sailboat having vortex generators of the present invention installed on the sails to increase the lift thereof and on the hull to increase the effectiveness of the keel and to reduce its drag.
Figure 30:
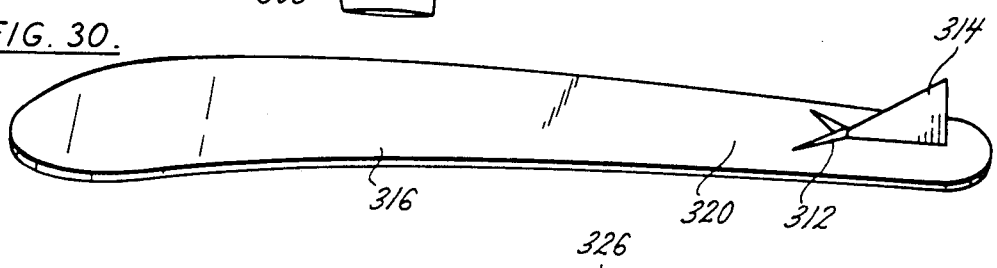
FIG. 30 is a perspective view of the underside of a water ski with the invention installed adjacent to the skeg thereof.

In FIG. 29 vortex generators 293 constructed according to the present invention are applied on both sides of the jib 294 and mainsail 296 of a sailboat 298. They can be constructed of mere stitching on the sails 294 and 296. Being of small size, the present vortex generators do not cause substantial parasitic drag when they are located on the upwind concave portion of the jib 294 and mainsail 296, yet on the downwind convex side they prevent boundary layer separation from the flow control surface formed by the sails 294 and 296 to thereby increase energy extracted from the wind. The generators of the present invention can also be applied to the mast 300 to overcome a separation bubble that normally exists between the mast 300 and the forward portion 302 of the main sail 296 adjacent thereto, caused by the discontinuity of the mast 300. As can be seen in FIG. 29 a vortex generator 304 is positioned on the hull 306 of the sailboat 298 directly ahead of the keel 308. The intersection 310 between the keel 308 and the hull 306 can be an area of separated water flow due to the turbulence caused by the keel. The vortex generator 304 reduces this tendency for separation thereby lowering the water drag on the sailboat 298 and allowing it to move faster under given wind conditions.

In a similar application vortex generator 312 is applied just forward of the skeg 314 of a device like a water ski or surf board 316 to reduce separation at the intersection 318 between the skeg 314 and the bottom 320 thereof. This reduces the drag through the water and increases the effectiveness of the skeg 314 and improves its stability and predictability.

Figure 31:
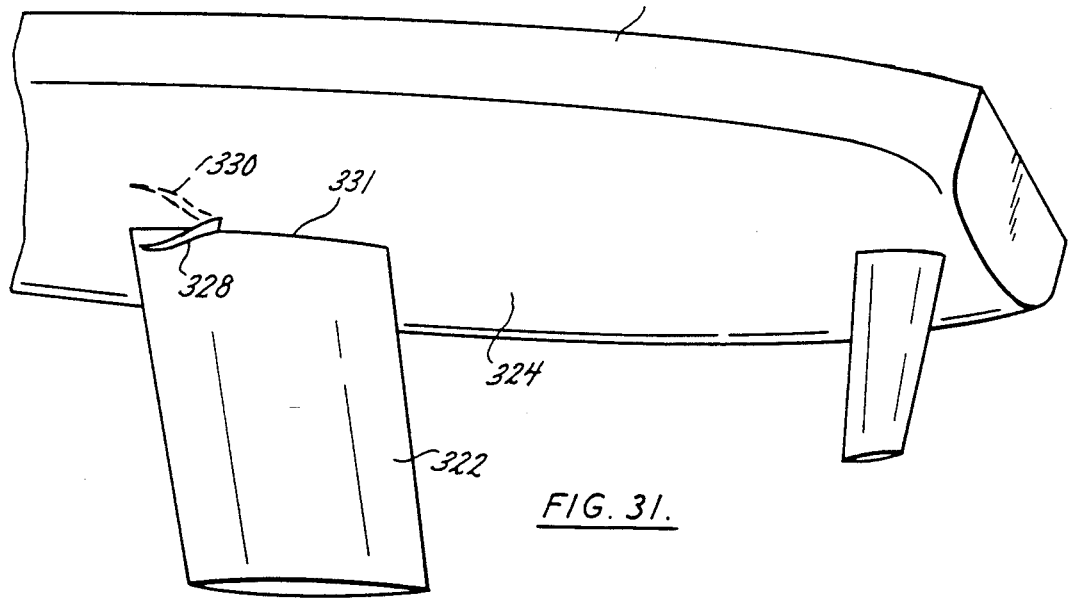
FIG. 31 is a perspective view of the hull and keel of a sailboat showing only one sidewall of the present invention installed on a side of the keel.

As shown in FIG. 31 when the separation occurs further back in the intersection between the keel 322 and the hull 324 of a sailboat 326, a special vortex generator 328, which is one half the previously discussed vortex generators, can be employed. For purposes of illustration, the missing sidewall 330 is shown in phantom outline as if it extended up through the hull 324. Such a vortex generator, of course, only produces one vortex and, therefore, does not have the advantage of twin vortex interaction but it releases the vortex directly along the intersection 331 to enable reduction of separation in an intersection that is in an otherwise unreachable position. Half vortex generators, such as 328 can be applied to both sides of the keel 322 to solve an intersection separation problem without inducing an excessive amount of parasitic drag.

Figure 32:
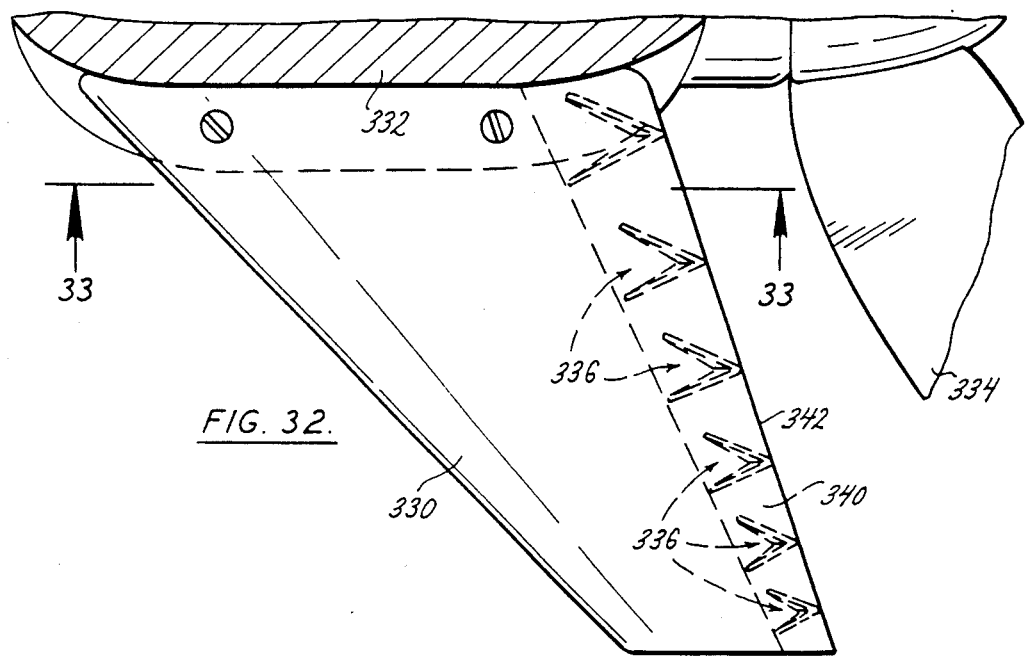
FIG. 32 is a top partial plan view of an outboard motor hydrofoil employing an array of the present vortex generators on the trailing-edge wedge thereof.
Figure 33:
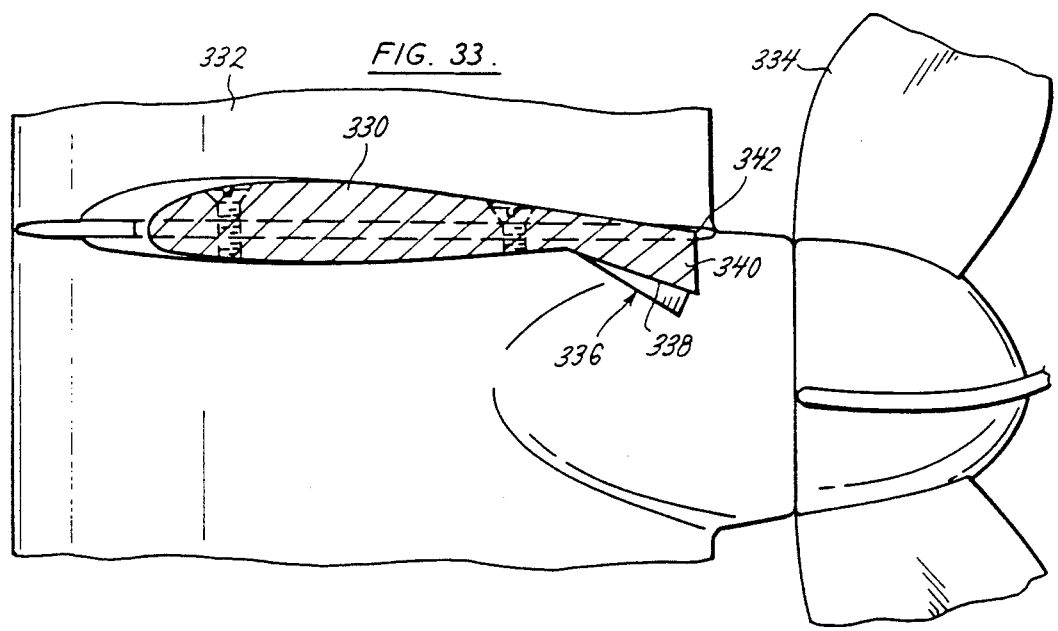
FIG. 33 is a cross-sectional view taken at line 33—33 in FIG. 32.

FIGS. 32 and 33 show a hydrofoil 330 attached to the downshaft housing 332 of an outboard motor. Such hydrofoils 330 are used as lifting hydrofoils to interact with the motor s propeller 334 to lift the rear of a boat, improving the fuel mileage and range by allowing the boat to remain on plane at reduced power settings. In the case shown, vortex generators 336 constructed according to the present invention, are applied to the underside 338 of a trailing-edge wedge 340, at the trailing-edge 342. Field tests of the hydrofoil 340 showed approximately 20% greater hydrofoil lift with the vortex generators 336 installed than without, and with no discernable drag Penalty. Since the angle attack did not change, the vortex generators 336 must have increased circulation lift while reducing base pressure drag.

Figure 34:
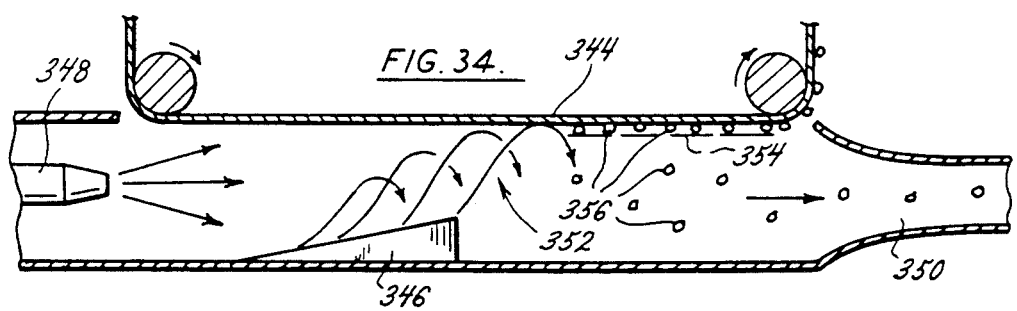
FIG. 34 is a diagrammatic view of a non-contact cleaning device which includes the present invention.

The present vortex generators have also been used successfully in a non-contact cleaning system used to clean webs of tape, film, textiles or fine tape 344 as shown in FIG. 34. Normally, a cleaning head suspended across the moving web of material 344 uses blowing and suction to dislodge unwanted particulate matter. However, small particles hide in the boundary layer and are resistant to all attempts to pneumatically remove them. With a present vortex generator 346 positioned between the blowing and suction orifices 348 and 350, the large vortices 352 reach through the boundary layer 354 to physically sweep away 15–20% more particles 356 than previously the present vortex generators produce huge vortices 352 with respect to vortex generator height where prior art vortex generators of the required height would have to be dangerously close to the material 344.

As can be seen from the previous examples the possible applications for the more efficient vortex generators of the present invention are nearly endless. Cars, trucks, aircraft, missiles, diffusers, fans, sails, hydrofoils and even water skis have used prior vortex generators for drag reduction, lift enhancement or stability augmentation and such applications can be greatly improved through the use of the present vortex generators. Whenever fluid flow is being managed aggressively, the present vortex generators can delay or prevent flow separation more powerfully than the prior art devices discussed above. The low parasitic drag of the present invention makes it particularly attractive in alleviating laminar separation bubbles that currently Plague low drag laminar foils, windmills, centrifugal blowers, small remotely piloted aircraft, high altitude aircraft and high speed gas turbine compressor airfoils and turbine blades.

Thus there has been shown and described vortex generators which can be used in numerous ways to improve the lift and drag characteristics of flow control devices subjected to adverse conditions or where the flow is being aggressively managed which fulfill all the objects and advantages sought therefor. Many changes, modifications, variations and other uses and applications of the subject vortex generators will become apparent to those skilled in the art after considering this Specification and the accompanying drawings. All such changes, modifications, variations and other uses and applications which do not depart from the spirit and scope of the invention are deemed to be covered by the invention which is limited only by the claims which follow.

What is claimed is:

1. A device for positioning on a surface used to control the flow of a medium, said device being for generating at least one vortex adjacent the flow control surface, said device including:
   a first sidewall for positioning upstanding from the flow control surface, said first sidewall having:
      a first tip portion positioned for facing generally upstream in the flowing medium; and
      a first apex portion positioned for being generally downstream in the flowing medium; and
   a wall extending in association with said first apex portion and for interacting therewith to eject flowing medium at said first apex portion away from the flow control surface when said device is positioned thereon, said wall being comprised of:
      a second sidewall for positioning upstanding from the flow control surface, said second sidewall having:
         a second tip portion positioned for facing generally upstream in the flowing medium; and
         a second apex portion positioned for being generally downstream in the flowing medium, said first sidewall further having:
      a first center portion between said first tip portion and said apex portion, and said second sidewall further having:
         a second center portion between said second tip portion and said apex portion, said first and second center portions being at a greater angle to each other up to 120° than said first and second tip portions and said first and second apex portions to form an Ogee planform.

2. A device for positioning on a surface used to control the flow of a medium, said device being for generating at least one vortex adjacent the flow control surface, said device including:
   a first sidewall for positioning upstanding from the flow control surface, said first sidewall having:
      a first tip portion positioned for facing generally upstream in the flowing medium; and
      a first apex portion positioned for being generally downstream in the flowing medium; and
   a wall extending in associating with said first apex portion and for interacting therewith to eject flowing portion and for interacting therewith to eject flowing medium at said first apex portion away from the flow control surface when said device is positioned thereon, said wall being comprised of:
      a second sidewall for positioning upstanding from the flow control surface, said second sidewall having:
         a second tip portion positioned for facing generally upstream in the flowing medium; and
         a second tip portion positioned for facing generally upstream in the flowing medium, said first sidewall further having;
      a first center portion between said first tip portion and said apex portion, and said second sidewall further having:
         a second center portion between said second tip portion and said apex portion, sand first and second center portions being at a greater angle to each other than said first and second tip portions and said first and second apex portions to form an Ogee like planform and said first and second apex portions are joined at an apex, said apex extending in the downstream direction to form a Y shaped planform.

3. A device for positioning on a surface used to control the flow of a medium, said device being for generating at least one vortex adjacent the flow control surface, said device including:
   a first sidewall for positioning upstanding from the flow control surface, said first sidewall having:
      a first tip portion positioned for facing generally upstream in the flowing medium; and
      a first apex portion positioned for being generally downstream in the flowing medium; and
   a second sidewall for positioning upstanding from the flow control surface, said second sidewall having:

a second tip portion positioned for facing generally upstream in the flowing medium; and a second apex portion positioned for being generally downstream in the flowing medium, said first and second apex portions being joined at an apex, said first sidewall further having:

a first outer edge;

a first inner edge for positioning at the flow control surface;

a first tip positioned to be at the furthest location of said first sidewall upstream in the flowing medium; and a shape with the distance from first inner edge to first outer edge increasing from said first tip to said apex, said first outer edge being curved to gradually increase its angle with said first inner edge from said apex to said first tip, said second sidewall further having:

a second outer edge;

a second inner edge for positioning at the flowcontrol surface;

a second tip positioned to be at the furthest location of said second sidewall upstream in the flowing medium; and a shape with the distance from second inner edge to second outer edge increasing from said second tip to said apex, said second outer edge being curved to gradually increase its angle with said second inner edge from said apex to said second tip.

4. A device for positioning on a surface used to control the flow of a medium, said device being for generating at least one vortex adjacent the flow control surface, said device including:

a first sidewall for positioning upstanding from the flow control surface, said first sidewall having:

a first tip portion positioned for facing generally upstream in the flowing medium; and a first apex portion positioned for being generally downstream in the flowing medium; and a second sidewall for positioning upstanding from the flow control surface, said second sidewall having:

a second tip portion positioned for facing generally upstream in the flowing medium; and a second apex portion positioned for being generally downstream in the flowing medium, said first and second apex portions being joined at an apex, said first sidewall further having:

a first outer edge;

a first inner edge for positioning at the flow control surface; and a first tip positioned to be at the furthest location of said first sidewall upstream in the flowing medium, said first outer edge extending from said first tip to said first apex portion and having at least one curved portion therealong, and said second sidewall further having:

a second outer edge;

a second inner edge for positioning at the flow control surface; and a second tip positioned to be at the furthest location of said second sidewall upstream in the flowing medium, said second outer edge extending from said second tip to said second apex portion and having at least one curved portion therealong.

5. A device for positioning on a surface used to control the flow of a medium, said device being for generating at least one vortex adjacent the flow control surface, said device including:

a first sidewall for positioning upstanding from the flow control surface, said first sidewall having:

a first tip portion positioned for facing generally upstream in the flowing medium; and a first apex portion positioned for being generally downstream in the flowing medium; and a second sidewall for positioning upstanding from the flow control surface, said second sidewall having:

a second tip portion positioned for facing generally upstream in the flowing medium; and a second apex portion positioned for being generally downstream in the flowing medium, said first and second apex portions being joined at an apex, said first sidewall further having:

a first convex outer edge; and a first inner edge for positioning at the flow control surface, said first sidewall extending between said first convex outer edge and said first inner edge, and said second sidewall further having:

a second convex outer edge; and a second inner edge for positioning at the flow control surface, said second sidewall extending between said second convex outer edge and said second inner edge.

6. A device for positioning on a surface used to control the flow of a medium, said device being for generating at least one vortex adjacent the flow control surface, said device including:

a first sidewall for positioning upstanding from the flow control surface, said first sidewall having:

a first tip portion positioned for facing generally upstream in the flowing medium;

a first apex portion positioned for being generally downstream in the flowing medium;

a first sidewall first side surface;

a first sidewall second side surface spaced from said first sidewall first side surface and facing generally the opposite direction therefrom; and a first center portion between said first tip portion and said apex portion, and a wall extending in association with said first apex portion and for interacting therewith to eject flowing medium at said first apex portion away from the flow control surface when said device is positioned thereon, said wall extending in association with said first apex portion is:

a second sidewall for positioning upstanding from the flow control surface, said second sidewall having:

a second tip portion positioned for facing generally upstream in the flowing medium;

a second apex portion positioned for being generally downstream in the flowing medium;

a second sidewall first side surface;

a second sidewall second side surface spaced from said second sidewall first side surface and facing generally the opposite direction therefrom; and a second center portion between said second tip portion and said apex portion, said first and second center portions being at a greater angle to each other than said first and second tip portions and said first and second apex portions to form an Ogee planform.

7. The device as defined in claim 6 wherein said first sidewall has:

a first outer edge;
a first inner edge for positioning at the flow control surface; and
a first tip positioned to be at the furthest location of said first sidewall upstream in the flowing medium, said first tip portion having a generally triangular shape with the distance from first inner edge to first outer edge increasing from said first tip toward said first apex portion, and wherein said second sidewall has:
a second outer edge;
a second inner edge for positioning at the flow control surface; and
a second tip positioned to be at the furthest location of said second sidewall upstream in the flowing medium, said second tip portion having a generally triangular shape with the distance from second inner edge to second outer edge increasing from said second tip toward said second apex portion.

8. A device for positioning on a surface used to control the flow of a medium, said device being for generating at least one vortex adjacent the flow control surface, said device including:
a first sidewall for positioning upstanding from the flow control surface, said first sidewall having:
a first tip portion positioned for facing generally upstream in the flowing medium;
a first apex portion positioned for being generally downstream in the flowing medium;
a first sidewall first side surface; and
a first sidewall second side surface spaced from said first sidewall first side surface and facing generally the opposite direction therefrom;
a wall extending in association with said first apex portion and for interacting therewith to eject flowing medium at said first apex portion away from the flow control surface when said device is positioned thereon, wherein said wall extending in association with said first apex portion is:
a second sidewall for positioning upstanding from the flow control surface, said second sidewall having:
a second tip portion positioned for facing generally upstream in the flowing medium;
a second apex portion positioned for being generally downstream in the flowing medium;
a second sidewall first side surface; and
a second sidewall second side surface spaced from said second sidewall first side surface and facing generally the opposite direction therefrom; and
an apex at which said first and second apex portions are joined, said first sidewall first side surface and said second sidewall first side surface intersecting at said apex, and wherein said first and second sidewalls are each concave reducing the angle therebetween from said first and second tips to said apex.

9. A device for positioning on a surface used to control the flow of a medium, said device being for generating at least one vortex adjacent the flow control surface, said device including:
a first sidewall for positioning upstanding from the flow control surface, said first sidewall having:
a first tip portion positioned for facing generally upstream in the flowing medium;
a first apex portion positioned for being generally downstream in the flowing medium;
a first sidewall first side surface; and
a first sidewall second side surface spaced from said first sidewall first side surface and facing generally the opposite direction therefrom;
a wall extending in association with said first apex portion and for interacting therewith to eject flowing medium at said first apex portion away from the flow control surface when said device is positioned thereon, wherein said wall extending in association with said first apex portion is:
a second sidewall for positioning upstanding from the flow control surface, said second sidewall having:
a second tip portion positioned for facing generally upstream in the flowing medium;
a second apex portion positioned for being generally downstream in the flowing medium;
a second sidewall first side surface; and
a second sidewall second side surface spaced from said second sidewall first side surface and facing generally the opposite direction therefrom; and
an apex at which said first and second apex portions are joined, said first sidewall first side surface and said second sidewall first side surface intersecting at said apex, and wherein said first and second sidewalls are each convex, increasing the angle therebetween from said first and second tips to said apex.

10. Vortex generator means including:
a flow control surface over which a medium flows from upstream to downstream;
a plurality of vortex generators positioned on said flow control surface in a cross-stream array, each of said vortex generators being generally V shaped, spaced from adjacent vortex generators and having:
a first sidewall positioned upstanding from said flow control surface, said first sidewall having:
a first tip portion facing generally upstream in the flowing medium;
a first apex portion positioned downstream in the flowing medium from said first tip portion;
a first sidewall first side surface; and
a first sidewall second side surface spaced from said first sidewall first side surface and facing generally the opposite direction therefrom;
a wall extending to intersect said first apex portion for interacting therewith to eject flowing medium at said first apex portion away from said flow control surface, and wherein said wall is:
a second sidewall upstanding from the flow control surface, said second sidewall having;
a second tip portion facing generally upstream in the flowing medium;
a second apex portion positioned downstream in the flowing medium from said second tip portion;
a second sidewall first side surface; and
a second sidewall second side surface spaced from said second sidewall first side surface and facing generally the opposite direction therefrom; and
an apex, wherein said first and second apex portions are joined at said apex.

11. The vortex generator means as defined in claim 10 wherein each of said vortex generators are spaced from adjacent vortex generators at least the maximum distance between said first and second tip portions thereof.

12. Vortex generator means including:

a flow control surface over which a medium flows from upstream to downstream; and at least two vortex generators positioned on said flow control surface in a cross-stream array, each of said vortex generators being spaced from any adjacent vortex generator and having first and second sidewalls positioned upstanding from said flow control surface, each of said sidewalls having:

a tip portion positioned upstream in said flowing medium;

an apex portion positioned downstream in said flowing medium;

a sidewall first side surface; and a sidewall second side surface spaced from said sidewall first side surface and facing generally the opposite direction therefrom, said apex portions of said sidewalls intersecting to form an apex at which flowing medium is ejected away from said flow control surface, said sidewall first side surfaces intersecting at said apex.

13. The vortex generator means as defined in claim 12 wherein said first and second sidewalls of each vortex generator each have:

an outer edge extending from said first side surface to said second side surface;

an inner edge for positioned at the flow control surface; and a tip at the furthest location of said sidewall upstream in the flowing medium, at least one of said sidewalls having;

an aspect ratio of distance from said tip to said apex versus maximum distance from said outer edge to said inner edge of at least 2.

14. The vortex generator means as defined in claim 13 wherein each of said sidewalls is planar from said tip thereof to said apex with at least one of said sidewalls having first and second side surfaces that are parallel.

15. The vortex generator means as defined in claim 14 wherein said sidewalls of each vortex generator intersect at said apex at an angle between 80° and 15°.

16. The vortex generator means as defined in claim 12 wherein said sidewalls of at least one of said vortex generators have:

a center portion between said tip portion and said apex portion, said center portions being at a greater angle to each other than said tip portions and said apex portions to form an Ogee planform.

17. The vortex generator means as defined in claim 16 wherein said center portions are at an angle to each other of up to 120°.

18. The vortex generator means as defined in claim 12 wherein said apex extends in the downstream direction to form a Y shaped planform.

19. The vortex generator means as defined in claim 12 wherein at least one of said sidewalls of at least one vortex generator has:

a outer edge;

a inner edge positioned at said flow control surface; and a tip at the furthest location of said sidewall upstream in the flowing medium, said tip portion having a generally triangular shape with the distance from inner edge to outer edge increasing from said tip toward said apex portion.

20. The vortex generator means as defined in claim 2 wherein said sidewalls of at least one vortex generator each are convex reducing the angle therebetween from said tip to said apex.

21. The vortex generator means as defined in claim 12 wherein said sidewalls of at least one vortex generator each are convex increasing the angle therebetween from said tip to said apex.

22. The vortex generator means as defined in claim 12 wherein said sidewalls of at least one vortex generator have:

an outer edge;

an inner edge positioned at said flow control surface; and a tip positioned at the furthest location of said sidewall upstream in the flowing medium, said outer edge being spaced from said inner edge a distance increasing from said tip to said apex.

23. The vortex generator means as defined in claim 12 wherein at least one of said sidewalls of at least one vortex generator have:

an outer edge;

an inner edge positioned at said flow control surface;

a tip positioned at the furthest location of said sidewall upstream in the flowing medium; and a generally triangular shape with the distance from said inner edge to said outer edge increasing from said tip to said apex, said outer edge ramping away from said inner edge at said apex portion thereof.

24. The vortex generator means as defined in claim 12 wherein at least one of said sidewalls of at least one vortex generator have:

an outer edge;

an inner edge positioned at said flow control surface;

a tip positioned at the furthest location of said sidewall upstream in the flowing medium; and a shape with the distance from inner edge to outer edge increasing from said tip to said apex, said outer edge being curved to gradually increase its angle with said inner edge from said apex to said tip.

25. The vortex generator means as defined in claim 12 wherein at least one of said sidewalls of at least one vortex generator have:

an outer edge;

an inner edge positioned at said flow control surface;

a tip positioned at the furthest location of said sidewall upstream in the flowing medium, said outer edge extending from said tip to said apex portion and having at least one curved portion therealong.

26. The vortex generator means as defined in claim 12 wherein at least one of said sidewalls of at least one vortex generator have:

a convex outer edge; and an inner edge positioned at said flow control surface, said at least one sidewall extending between said convex outer edge and said inner edge.

27. The vortex generator means as defined in claim 12 further including:

a strip of embossable material having:

a upper side forming said flow control surface;

a lower side;

a front edge;

a back edge downstream from said front edge; and an adhesive layer on said lower side, said at least two vortex generators being embossed out of said upper side.

28. The vortex generator means defined in claim 27 wherein the apex portions of said vortex generators are at generally equal distances from said back edge.

29. The vortex generator means as defined in claim 12 further including:

a leading edge;
a trailing edge;
a first surface extending from said leading edge to said trailing edge having a predetermined first camber;
a second surface extending from said leading edge to said trailing edge having a predetermined second camber less than said first camber;
a wedge formed on said second surface adjacent said trailing edge to form a blunt surface at said trailing edge, said wedge having said flow control surface thereon.

30. The vortex generator means as defined in claim 12 further including:
a sail including:
 a foot;
 a top;
 a leading edge;
 a trailing edge;
 a first side extending from said leading edge to said trailing edge and from said top to said foot forming said flow control surface; and
 a second side extending from said leading edge to said trailing edge and from said top to said foot, said at least two vortex generators formed in arrays extending at least a portion of the distance between said foot and said top.

31. The vortex generator means as defined in claim 30 wherein said vortex generators are formed of stitching from said first side to said second side.

32. The vortex generator means as defined in claim 31 wherein said sidewalls of said vortex generators are formed from flexible material which erects when air strikes said apex.

33. The vortex generator means as defined in claim 12 further including:
a strip of material having undesired particles thereon;
a source of cleaning medium which flows against said strip of material in a predetermined direction;
a collector of the flow of cleaning medium, the flow control surface extending between said source and said collector; and
means to move said strip of material generally parallel to said flow control surface and space said strip of material therefrom.

* * * * *